United States Patent
Wadhwa et al.

(10) Patent No.: US 11,615,397 B2
(45) Date of Patent: Mar. 28, 2023

(54) METHOD AND SYSTEM FOR PROVIDING ACCESS TO A SERVICE FROM A MOBILE COMPUTING DEVICE

(71) Applicant: Mastercard International Incorporated, Purchase, NY (US)

(72) Inventors: Jitendra Singh Wadhwa, Pune (IN); Arunmurthy Gurunathan, Chesterfield, MO (US)

(73) Assignee: Mastercard International Incorporated, Purchase, NY (US)

( * ) Notice: Subject to any disclaimer, the term of this patent is extended or adjusted under 35 U.S.C. 154(b) by 16 days.

(21) Appl. No.: 17/149,258

(22) Filed: Jan. 14, 2021

(65) Prior Publication Data

US 2021/0216998 A1 Jul. 15, 2021

(30) Foreign Application Priority Data

Jan. 14, 2020 (SG) .......................... 10202000322Y

(51) Int. Cl.

| G06Q 20/34 | (2012.01) |
| G06F 9/54 | (2006.01) |
| G06Q 20/32 | (2012.01) |
| H04L 9/40 | (2022.01) |
| G06Q 20/38 | (2012.01) |
| G06Q 20/36 | (2012.01) |

(52) U.S. Cl.
CPC .......... *G06Q 20/353* (2013.01); *G06F 9/547* (2013.01); *G06Q 20/3224* (2013.01); *G06Q 20/3674* (2013.01); *G06Q 20/3821* (2013.01); *H04L 63/08* (2013.01)

(58) Field of Classification Search
CPC ............. G06Q 20/353; G06Q 20/3224; G06Q 20/3674; G06Q 20/3821; G06F 9/547; H04L 63/08
See application file for complete search history.

(56) References Cited

U.S. PATENT DOCUMENTS

| 8,781,953 B2 * | 7/2014 | Kasower .............. G06Q 30/016 705/38 |
| 9,092,690 B2 | 7/2015 | Rowley et al. |
| 9,195,898 B2 | 11/2015 | Huang et al. |
| 9,298,979 B2 | 3/2016 | Nepomniachtchi et al. |

(Continued)

FOREIGN PATENT DOCUMENTS

AU 2013217210 8/2013

OTHER PUBLICATIONS

"Defining Terms: What Is a Directory Service?" by Dummies, dated Mar. 26, 2016 https://www.dummies.com/article/technology/information-technology/networking/general-networking/defining-terms-what-is-a-directory-service-199412 (Year: 2016).*

*Primary Examiner* — Gregory S Cunningham, II
*Assistant Examiner* — Raven E Zeer
(74) *Attorney, Agent, or Firm* — Hovey Williams LLP

(57) ABSTRACT

A method, performed at a mobile device, for accessing a service, comprises: determining, from payment card information stored on or obtained at the mobile device, a list of services that are available in relation to the payment card; receiving a selection of one of the services; determining at least one corresponding communication channel by which the selected service is accessible; and opening the at least one corresponding communication channel to thereby access the service.

11 Claims, 7 Drawing Sheets

(56) References Cited

U.S. PATENT DOCUMENTS

| | | |
|---|---|---|
| 9,449,347 B2 | 9/2016 | Schloter et al. |
| 9,727,856 B2 | 8/2017 | Yankovich et al. |
| 2013/0073459 A1* | 3/2013 | Zacarias ............... G06Q 30/08 705/41 |
| 2013/0210523 A1* | 8/2013 | Arumugam ......... G07F 17/3237 463/31 |
| 2014/0076965 A1* | 3/2014 | Becorest ............. G06Q 20/342 235/375 |
| 2017/0178098 A1* | 6/2017 | Hu ........................ G06Q 40/02 |
| 2018/0174134 A1* | 6/2018 | Carpenter ............ G06Q 20/326 |
| 2019/0034751 A1* | 1/2019 | Tse ........................ G06V 10/10 |
| 2020/0410758 A1* | 12/2020 | Hamchuk ........... G06Q 30/0631 |
| 2021/0004802 A1* | 1/2021 | Rule ................... G06K 9/6201 |

\* cited by examiner

METHOD AND SYSTEM FOR PROVIDING ACCESS TO A SERVICE FROM A MOBILE COMPUTING DEVICE

CROSS REFERENCE TO RELATED APPLICATIONS

This application claims priority to Singaporean Application No. 10202000322Y, filed Jan. 14, 2020, which is incorporated herein by reference in its entirety

TECHNICAL FIELD

The present disclosure relates to a method and a system for providing access to a service from a mobile computing device.

BACKGROUND

Despite the ubiquity of mobile devices such as smartphones, it remains challenging in some circumstances for users of such devices to access desired services.

For example, service providers such as banks and other financial institutions may provide online banking services implemented via a website or app front end, but the information available to users through these channels is typically limited, and is constrained by the user interface that the service provider chooses to implement. A bank may enable users to readily see their account balances via its associated mobile banking app, but may not routinely display a points balance of a loyalty program that is associated with the user's credit card. Should such a feature be desired, this requires a redesign of both the front end and back end of the mobile banking app. Users may also want access to other banking information that is not usually displayed in a standard mobile banking interface.

Another circumstance in which a user may have difficulty in obtaining access to accurate information is when making a purchase in a foreign country, where it is desired to know the amount that will be charged to the user's card in the currency of the card. The actual amount may depend not only on the bank's conversion rate for foreign currency credit or debit card transactions (which may not match the interbank rate), but also on the particular fees that the bank charges for such transactions.

Partly to address the above need, but also as a means of deriving extra revenue, a process called Dynamic Currency Conversion (DCC) may be implemented at point of sale terminals. DCC gives the cardholder the option to pay in their "home" currency, thus being able in principle to see how much the transaction will actually cost. However, DCC is generally considered to be undesirable for cardholders because it incurs an additional currency conversion fee imposed by the DCC service provider, and the cardholder's issuer may in any event charge an overseas transaction fee.

It would be desirable to address one or more of the above difficulties, or at least to provide a useful alternative.

SUMMARY OF THE PRESENT DISCLOSURE

Disclosed herein is a method, performed at a mobile device, for accessing a service, the method comprising:
  determining, from payment card information stored on or obtained at the mobile device, a list of services that are available in relation to the payment card;
  receiving a selection of one of the services;
  determining at least one corresponding communication channel by which the selected service is accessible; and
  opening the at least one corresponding communication channel to thereby access the service.

The list of services may be determined by the mobile device transmitting a request comprising the payment card information, or part thereof, to a directory service; and wherein the directory service returns the list of services. The request may be an open API call, for example.

In some embodiments, the payment card information is obtained by capturing an image of the payment card.

In some embodiments, the payment card information is stored in, or in association with, a digital wallet application on the mobile device.

The at least one corresponding communication channel may be determined by:
  segmenting the image to identify at least one image element that is associated with the selected service; and
  identifying, from the at least one image element, the at least one corresponding communication channel by which said service is accessible.

The image may be captured by a native camera application of the mobile computing device.

In some embodiments, the request further comprises contextual information, and the at least one corresponding communication channel is determined according to both the payment card information and the contextual information.

The contextual information may comprise a geolocation of the mobile device.

The service may be one or more of: a currency conversion service; an account balance query service; and a call centre.

Certain embodiments may include validating an authentication credential prior to opening the at least one corresponding communication channel.

Also disclosed herein is a system for enabling access to a service by a user of a mobile device, the system comprising:
  at least one processor; and
  computer readable storage having stored thereon instructions for causing the at least one processor to perform a service enablement process comprising:
  receiving, from the mobile device, a request for a list of available services, the request comprising information stored on or obtained at the mobile device relating to a payment card;
  determining, from the information relating to the payment card, a list of services that are available in relation to the payment card;
  transmitting, to the mobile device, the list of services;
  receiving, from the mobile device, a selection of one of the services;
  determining at least one corresponding communication channel by which the selected service is accessible; and
  opening the at least one corresponding communication channel to thereby enable access to the service.

The request may be an open API call.

The payment card information may comprise an image of the payment card.

In some embodiments, the payment card information is stored in, or in association with, a digital wallet application of the mobile device.

The at least one corresponding communication channel may be determined by:
  segmenting the image to identify at least one image element that is associated with the selected service; and
  identifying, from the at least one image element, the at least one corresponding communication channel by which said service is accessible.

In certain embodiments, the request further comprises contextual information, and wherein the at least one corresponding communication channel is determined according to both the payment card information and the contextual information.

The contextual information may comprise a geolocation of the mobile device.

In certain embodiments, the service is one or more of: a currency conversion service; an account balance query service; and a call centre.

The service enablement process may further include validating an authentication credential prior to opening the at least one corresponding communication channel.

BRIEF DESCRIPTION OF THE DRAWINGS

Embodiments of the present invention will now be described, by way of non-limiting example, with reference to the drawings in which.

DETAILED DESCRIPTION

Embodiments of the invention relate to a method for accessing a service via a mobile computing device. The method may comprise determining one or more services that are available in relation to a payment card, based on information relating to the payment card that is stored on the mobile device. For example, the information may be provided by capture of an image of the payment card. The image may be analysed to identify image elements that are associated with the one or more services. Alternatively, the information may be stored in a digital wallet application executing on the mobile device.

The one or more services may be determined by transmitting the information relating to the payment card, or part thereof, to a directory service via an open API call. The directory service may parse the information and return a list of the one or more services to the mobile device.

A user, post-authentication, may provide a selection of one of the online services at the mobile device. The mobile device may determine at least one corresponding communication channel by which the selected online service is accessible. The mobile device may open the at least one corresponding communication channel to thereby access the service.

As used herein, a "payment card" refers to a credit card, a debit card, a prepaid card, a charge card, a membership card, a promotional card, a frequent flyer card, an identification card, a gift card, and the like. It may also refer, in certain situations, to "virtual" cards which are associated with an account number and can be used for transactions (e.g. online transactions, or in-store transactions when provisioned in a digital wallet executing on a mobile device enabled for contactless transactions), but where no counterpart physical card exists.

Figure 1:
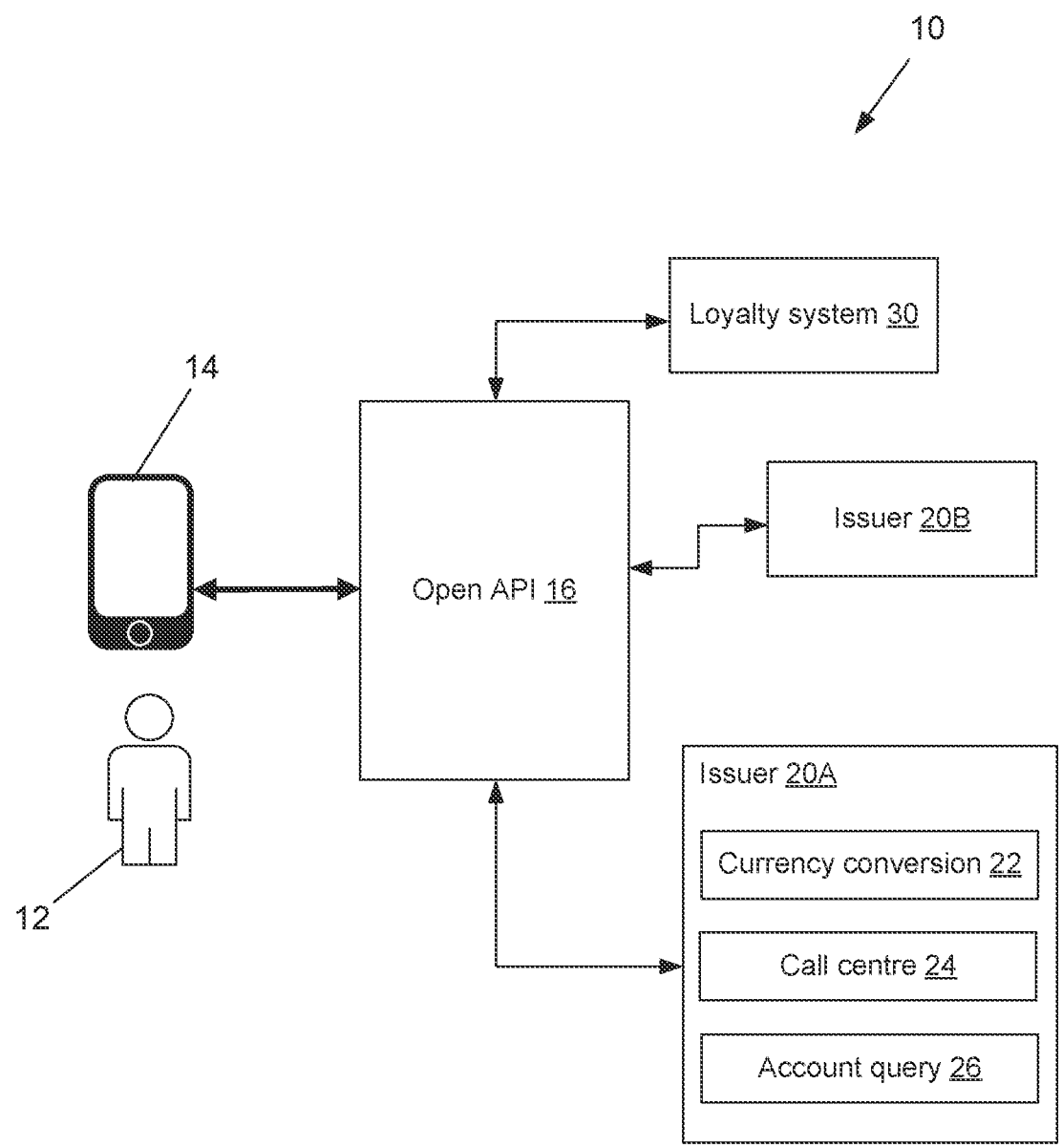
FIG. 1 is a block diagram of an embodiment of a system for providing access to a service from a mobile device.

FIG. 1 shows an exemplary embodiment of a system for providing access to a service. The system 10 includes a mobile device 14 of a user 12 who wishes to access the service via the device 14. Device 14 is in communication with an open API service 16 over a communications network such as the public Internet. The open API service 16 is also in communication with a plurality of issuers 20A, 20B, and a loyalty system 30. Only two issuers are shown, but it will be appreciated that the open API service 16 may communicate with a great many such issuer systems in order to provide access to services for cardholders of those issuers.

Open API service 16 acts as an intermediary between the mobile device 14 and issuers 20A, 20B. In some embodiments, open API service 16 may be operated by a payment network such as Mastercard. The open API service 16 is responsible for management of multi-threading, and for making complex direct calls to issuers 20A, 20B. In some embodiments, API calls may be made by open API service 16 in accordance with the AsyncAPI specification (https://www.asyncapi.com/docs/specifications/2.0.0/). In some embodiments, API calls may be formatted according to JSON standards.

For example, mobile device 14 may make a request to open API service 16 that includes information relating to the payment card, such as a primary account number (PAN) or partial PAN of the payment card. The request may be for a list of services that is available in relation to the payment card. Open API service 16 may determine, based on the provided information, which services are available.

In one example, open API service 16 determines an issuer of the payment card based on the PAN or partial PAN (e.g., based on the first 6 digits). For example, open API service 16 may determine from the PAN that the issuer for the card is issuer 20A, and send a request to issuer 20A for services that are available in relation to the card. Issuer 20A may respond with a list of services, such as a currency conversion service 22, a call centre service 24, and an account query service 26. Open API service 16 may send the list of services to mobile device 14, and the list of services may be displayed as a menu of options on mobile device 14, for example within a web browser executing on mobile device 14.

In another example, instead of providing the PAN, mobile device 14 may capture an image of the payment card, and transmit the captured payment card image as part of the request to the open API service 16. Open API service 16 may perform an image analysis process to segment the captured payment card image and identify one or more graphical elements that assist to identify the issuer of the payment card, such as a bank (or other financial institution) logo, payment network logo (e.g. Mastercard), card design element, and so on. The identified graphical elements may be matched to entries in an issuer database to determine an identifier of the issuer 20A, and send a request to issuer 20A for a list of available services (and return the list to mobile device 14) as above. This could be useful in situations where the PAN is not imprinted on the payment card, or where the user of mobile device 14 does not wish to transmit the PAN in the clear. In the latter case, the mobile device 14 may include functionality for obscuring or redacting the PAN from the payment card image prior to transmitting it to open API service 16.

In some embodiments, the request may include contextual information, such as geolocation information acquired by the mobile device 14. In another example, the contextual information may include calendar information. The open API service 16 may determine which services are available based both on the payment card information and the contextual information. For example, where the contextual information includes calendar information, if the user's calendar shows they have a flight or hotel booking scheduled, this may be used as context information to retrieve details of a concierge service associated with a loyalty program for the user's payment card.

The request made by mobile device 14 may be initiated in various ways.

For example, a dedicated application executing on mobile device 14 may be used to initiate the request. A user may capture an image of the payment card, and the dedicated application may analyse the image to extract details of the payment card for the purposes of generating the API call. Alternatively, the application may simply send the image as part of the API call, and the open API service 16 may perform the image analysis to extract the card information, as described briefly above.

In another example, the request may be initiated from a digital wallet application executing on the mobile device 14. The digital wallet application may display details of one or more physical payment cards that have been digitised for use in the digital wallet, and/or one or more virtual payment cards. The mobile device 14 may receive a selection of one of the cards in the digital wallet, extract card information (such as a PAN or part thereof) based on the selection, and make a request to open API server 16 for a list of available services for the card.

Figure 2:
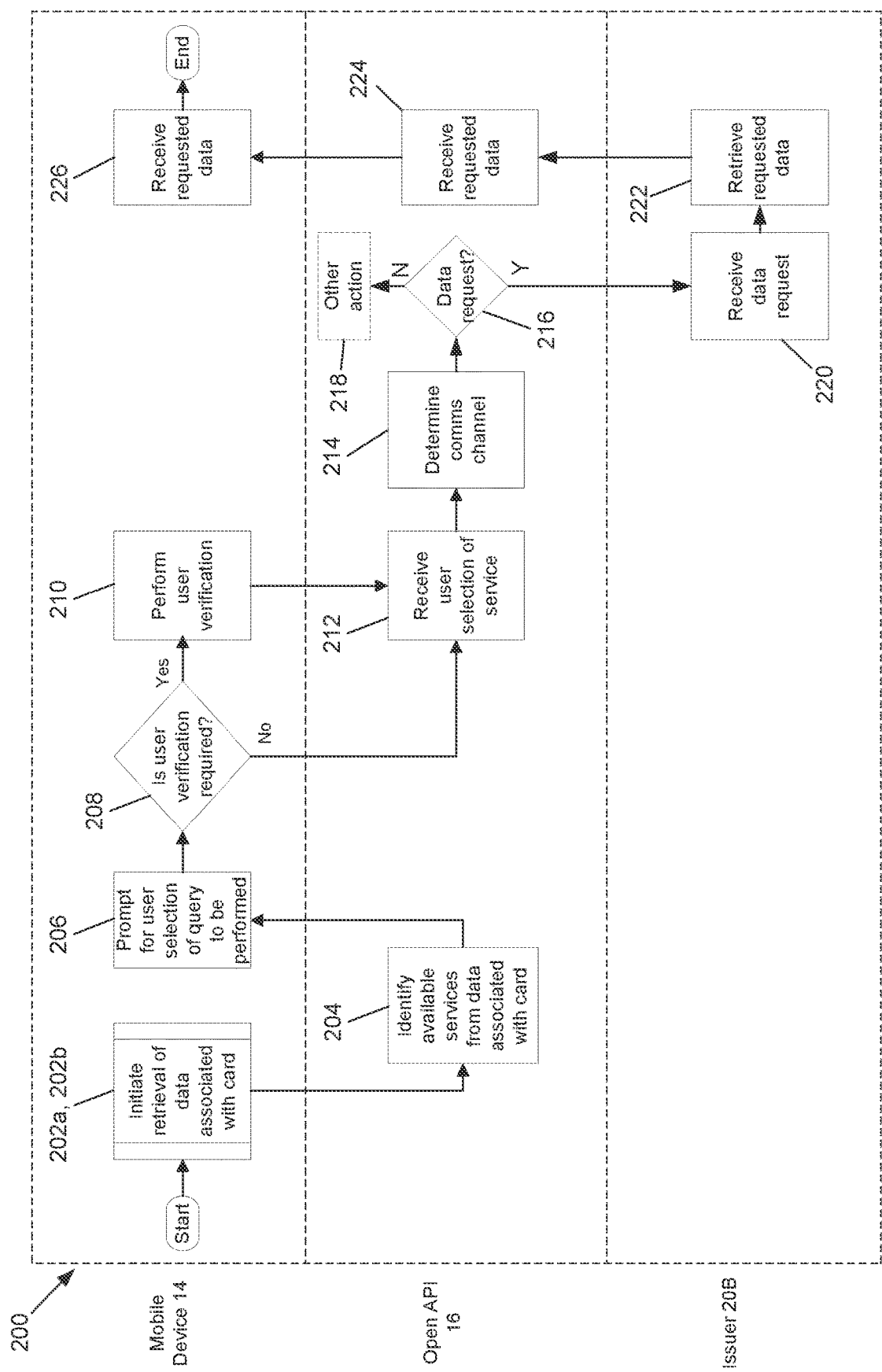
FIG. 2 is a flow diagram of an example of a method for providing access to a service.

Turning to FIG. 2, certain embodiments of a method of providing access to a service from a mobile device will be described.

The method 200 includes a process of initiating retrieval of data associated with a payment card. Two embodiments of this process, referenced as 202a and 202b and shown in more detail in FIGS. 3 and 4, will be described in more detail below. In either of these embodiments, the result of the process is information relating to a payment card, such as the PAN (or a partial PAN) of the card, and contextual information such as geolocation information. Process 202a or 202b also results in a request formed using the payment card information and optionally, the contextual information, and that is made to open API service 16. The request is for a list of available services associated with the payment card.

Figure 6:
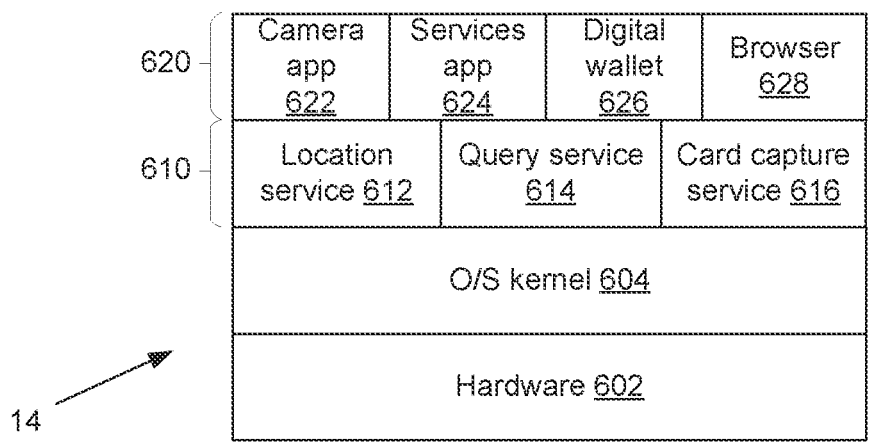
FIG. 6 is a block diagram of a high-level architecture of a mobile device.

From the perspective of the mobile device 14, and with reference to the architecture diagram of FIG. 6, steps of the method 200 may be performed within one or more of a camera application 622, a services application 624, a digital wallet application 626, or a browser application 628, each of which resides in an application layer 620 of the mobile device 14. Any of these applications may cooperate with one or more services in an operating system services layer 610 that sits above the O/S kernel 604, as will later be described in more detail.

At step 204, the open API service 16 receives the request, and analyses the data associated with the payment card to determine which services are available in relation to the payment card. In some embodiments, open API service 16 maintains a list of services for each issuer in accordance with an issuer identifier (e.g., at BIN/IIN level). Issuers 20A, 20B may register for services that they wish to support via open API. The open API service 16 may retrieve the list of services for an issuer updated based on the subscription by that issuer (which can be updated on a daily basis, for example). Advantageously, where the open API service is operated by a payments network such as Mastercard, the service registration/update process may be conducted using existing infrastructure, since standard payment network operating standards require that any new features that an issuer wants to support must be subscribed for at BIN level or issuer level.

For example, open API service 16 may determine, from the PAN or partial PAN, which entity issued the payment card. Typically, this can be done by taking the first 6 digits of the PAN, which according to payment card industry standards, define a Bank Identification Number (BIN), also called an Issuer Identification Number (IIN), of the payment card.

The BIN is used to look up an identifier of the issuer in a BIN table. For example, the BIN table may be stored at the open API service 16, or may be maintained by another entity, such as a payment network, with which the open API service 16 communicates. In some embodiments, a plurality of different payment networks may store respective different, non-overlapping, BIN tables, and the open API service 16 may first identify the payment network (e.g. according to the first digit of the PAN), and then send a BIN lookup request to the identified payment network.

Once the issuer identifier is determined, the open API service 16 may determine a list of available services based on the issuer identifier. For example, open API service 16 may maintain a database of services that is associated with each issuer, and generate the list for an issuer based on a search of the database for the record associated with the issuer's identifier. Some issuers, such as issuer 20A for example, may provide access to currency conversion, account query and call centre services, while some other issuers may only provide access to a subset of those, or to additional services not offered by issuer 20A.

The list of available services may be identified at least partly based on contextual information. For example, if the request from mobile device 14 includes geolocation information, then the open API service 16 may return a list that includes a currency conversion service and a call centre service. Further, open API service 16 may retrieve, from the database of services, a phone number that is local to the geolocation of the mobile device, and associate the local number with the call centre service list item. For example, if it is determined that the geolocation is within the United States, the open API service 16 may retrieve the US call centre number associated with the issuer identifier in the database of services.

Once the list of available services is determined, it is transmitted by open API service 16 to mobile device 14. At step 206, the mobile device 14 then displays the list of available services, and prompts the user 12 to enter a selection of a desired service from the list. For example, if the request for the list of available services is initiated from services application 624, the list may be displayed within the services application 624, or services application 624 may invoke digital wallet application 626 and the list may be displayed in the digital wallet application 626. In some embodiments, the request may be initiated from camera app 622, and camera app 622 may invoke (for example) services application 624 to display the list for selection of items by the user 12.

Once a service has been selected from the list, the mobile device 14 (e.g., via services application 624) checks whether the selected service requires user verification. An account query service is an example of a service for which user verification would be required.

At step 208, if user verification is required, then a user verification step 210 is performed at mobile device 14. For example, digital wallet application 626 may prompt the user 12 to enter a PIN or other passcode associated with the payment card. Once the passcode is entered, the digital wallet application 626 may invoke query service 614, in O/S services layer 610, to request validation of the passcode at the corresponding issuer, e.g. issuer 20A, via open API service 16. query service 614 may use a delegated authorisation protocol, such as OAuth 1.0a, to request authorisation of user 12 at the issuer 20A.

If user verification is successfully completed, or is not required, then at step 212, the open API service 16 receives the selection of the service.

At step 214, the open API service 16 determines, based on the selection of the service, a corresponding communication channel. For example, if the service is an account query service, the corresponding communication channel may be a secure connection to the issuer 20B. If the service is a currency conversion service, or another service that does not require access to confidential data, the corresponding communication channel may be a non-secure connection to issuer 20B or another system, such as a currency conversion website. If the service is a call centre service, the corresponding communication channel may be a voice connection over a cellular network to the local number retrieved at step 204.

At step 216, open API service 16 determines if the selected service is a data request, and if so, opens the corresponding communication channel to retrieve the requested data. For example, the open API service 16 may open a secure connection at step 220 to issuer 20B to request an account balance of the user 12, noting that the user 12 has already been verified if necessary at step 210. At step 222, issuer 20B retrieves the requested data, such as the balance of the user 12's payment card account, or a loyalty points balance of a loyalty program associated with the user 12's payment card account. This is transmitted to open API service 16 at step 224, which then transmits it to mobile device 14. At step 226, the mobile device 14 receives the requested data and displays it within the application from which the request was initiated, for example within services app 624, or digital wallet application 626.

If the selected service is not a data request, then the open API service 16 may initiate another action, at step 218. For example, if the service is a call centre service, open API service 16 may simply cause the already retrieved local call centre number from step 204 to be displayed at mobile device 14. To this end, services app 624 or digital wallet application 626 may display the call centre number as part of an active GUI element (such as a hyperlink or button) that the user 12 can interact with to initiate a phone call to the local call centre number.

Figure 3:
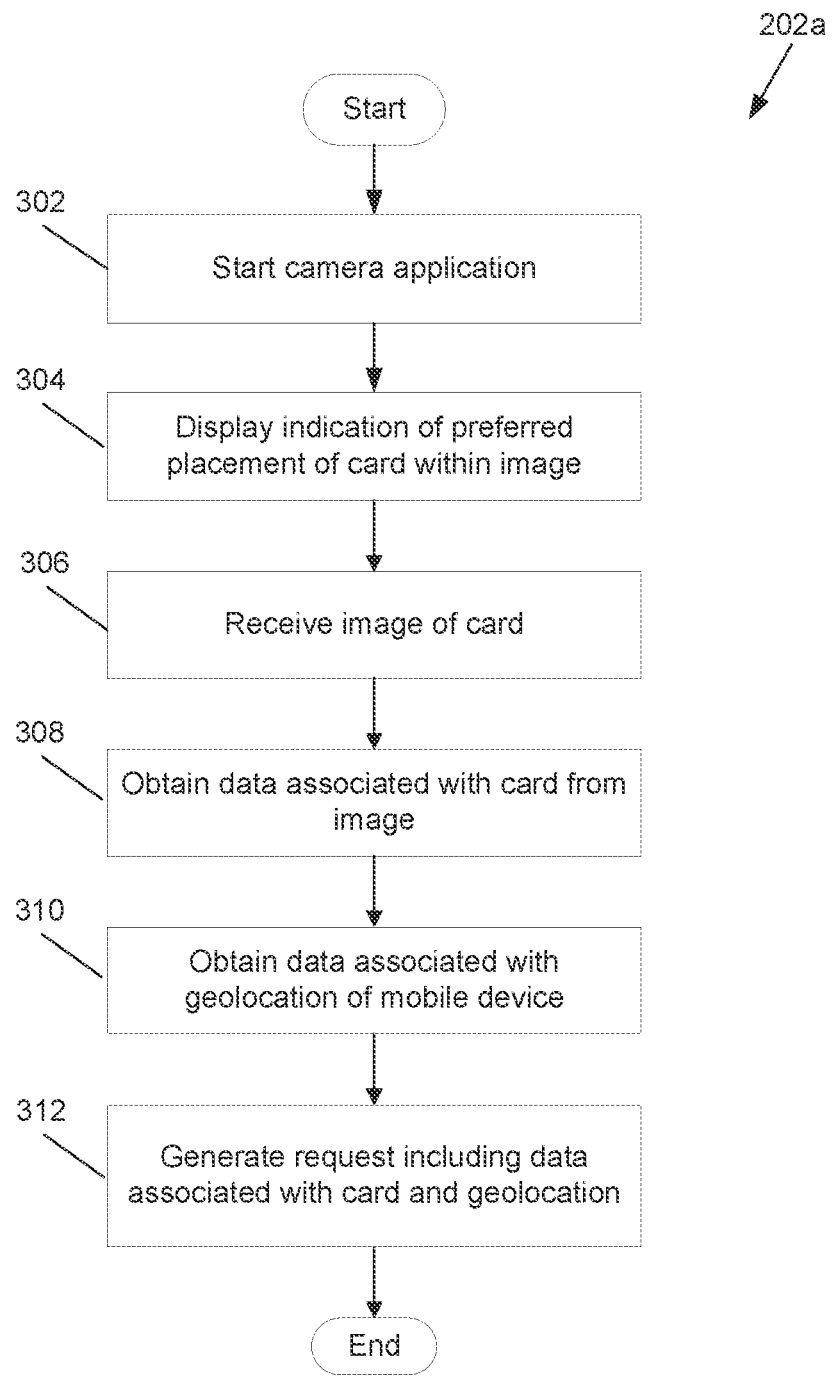
FIG. 3 is a flow diagram of a first example of a card information retrieval process of the method of FIG. 2.

Turning now to FIG. 3, a first example of a process for initiating retrieval of information associated with a payment card will be described.

Figure 7:
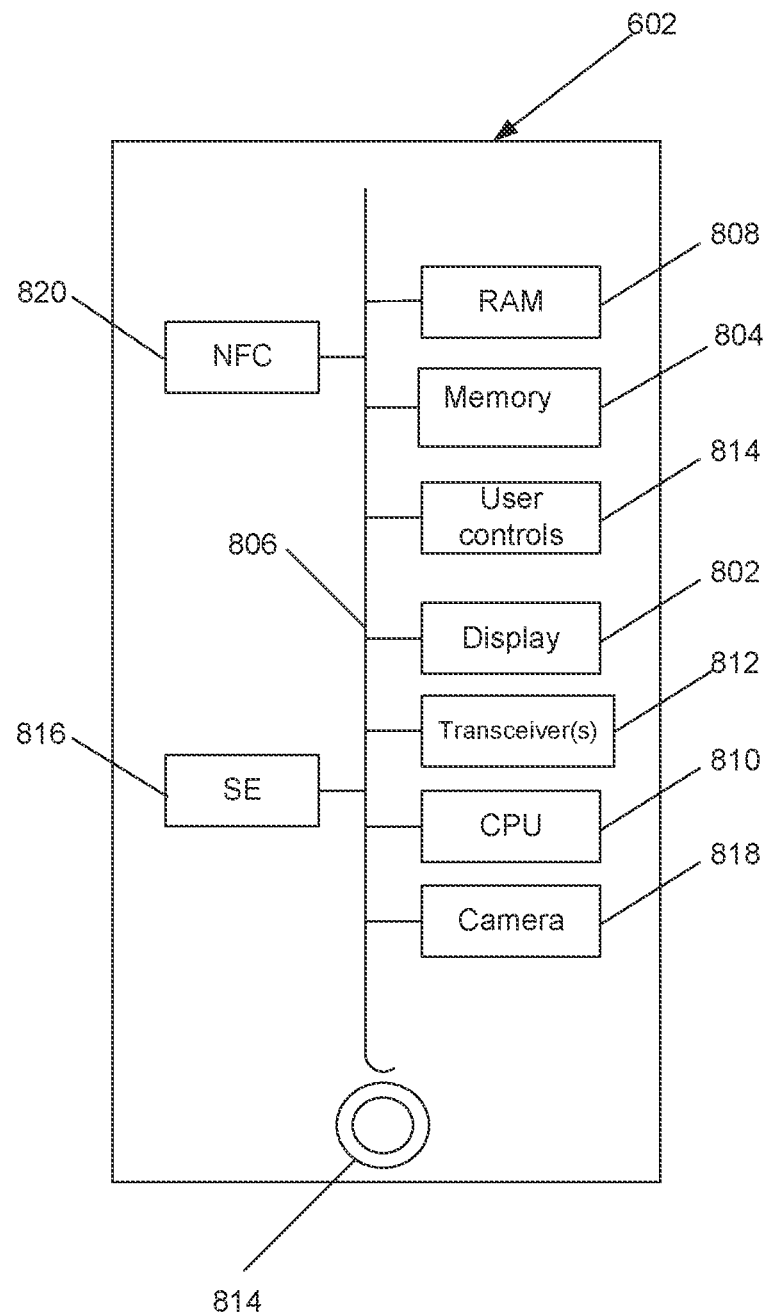
FIG. 7 is a block diagram showing an alternative representation of the architecture of the mobile device of FIG. 6.

In the process 202a, information relating to the payment card is captured using a camera 818 of the mobile device 14 (see FIG. 7). For example, camera application 622 may be launched at step 302. Camera application 622 may invoke a card capture service 616 in O/S services layer 610, which causes a preferred placement of the card within an image capture window to be displayed at step 304. For example, a visual guide such as an outline of a card shape may be displayed within the image capture window at a predetermined location, to prompt the user 12 to position the payment card within the guide to optimise the image capture. By providing a guide at a known location on the display, the speed and/or accuracy of identifying the payment card information may be improved, since card capture service 616 may be more readily able to discern particular card design elements relative to the coordinates of the visual guide.

The card capture service 616 may be invoked by the user tapping or otherwise interacting with a control element within camera application 622. Alternatively, another application, such as services application 624 or digital wallet 626, may invoke the camera application 622 in a manner that causes card capture service 616 to also be invoked when the camera application 622 starts.

At step 306, card capture service 616 causes an image of the payment card to be captured. This may occur automatically once the edges of the payment card overlap sufficiently with the area occupied by the visual guide. Alternatively, the user 12 may activate a physical or virtual control, such as a button, of the mobile device 14 to cause the image to be captured.

Figure 5:
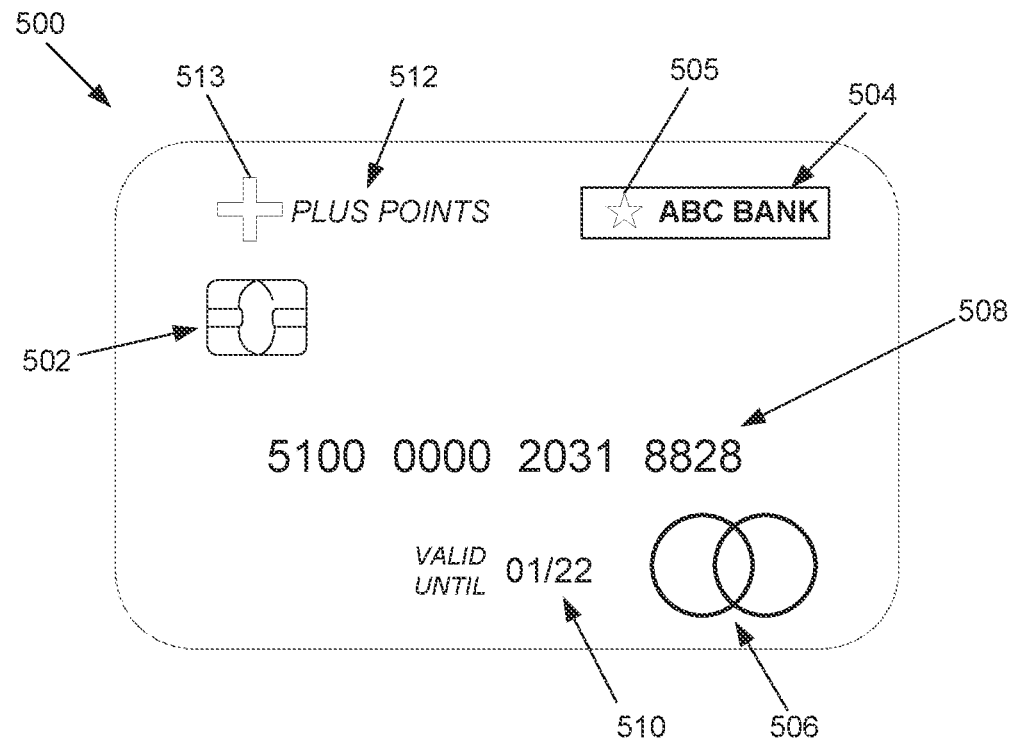
FIG. 5 is a schematic illustration of a typical payment card.

At step 308, the card capture service 616 determines data associated with the card based on the captured image. The card capture service 616 may perform an edge detection process on the captured image to define the boundaries of the card. Alternatively, or in addition, the card capture service 616 may perform an object detection process that looks for a predefined card shape, such as the rounded rectangle of FIG. 5. To this end, the card capture service 616 may perform simple template matching, or another image segmentation technique.

Once the card shape has been identified within the captured image, card capture service 616 may search for specific elements within the card shape. For example, and with reference to FIG. 5 which shows a typical payment card 500, card capture service 616 may perform an optical character recognition (OCR) process to extract text elements, such as the bank name 504, PAN 508, expiry date 510, and loyalty program name 512. Card capture service 616 may also perform an image segmentation process to extract graphical elements such as bank logo 505, loyalty program logo 513, integrated circuit element 502, or payment network logo 506.

The image segmentation process may take as input a set of rules regarding payment card design. The set of rules may include approximate possible locations for elements such as payment network logos and bank logos. For example, a rule may be that the payment network logo 506 is always at or near the bottom right of the card 500. Another rule may be that the bank logo (whether this is considered to be graphical element 505 alone, or the combination of text 504 and graphics 505) is always at or near either the top left or the top right of the card 500. By using a set of rules or template card design for the image segmentation, it becomes more efficient to search for and identify specific elements of interest to extract the desired payment card information.

Still at step 308, once text and graphic elements have been extracted from the image, they may be analysed to determine information relating to the payment card that can be sent as part of a request to the open API service 16. For example, when analysing the text elements, card capture service 616, or an application that invokes it, may search for a string that conforms to an expected PAN format (e.g., a 16 to 19 digit number), to thereby identify the PAN 508. In another example, if a graphical element has been tagged as a loyalty program logo, such as graphical element 513, that graphical element, and the fact that it has been tagged as a loyalty program logo, may form part of the request to the open API service 16.

At step 310, data associated with the geolocation of the mobile device 14 can be obtained. For example, services application 624, or another application in the application layer 620 of mobile device 14, may invoke location service 612 to obtain GPS coordinates and/or cell tower triangulation coordinates corresponding to the geolocation of the mobile device 14. In some examples, precise coordinates may not be required, and higher-level information such as a country, state or city in which the mobile device 14 is located may be extracted.

At step 312, a request message is generated, including the data associated with the payment card (e.g. payment card 500), and the geolocation information.

The text elements and the graphical elements (and any tags associated with either) may form part of the request sent to open API service 16, and may be used by the open API service 16 to identify available services. For example, if a loyalty program logo is part of the request, then open API service 16 may add a loyalty program account query service to the list of available services. Open API service 16 may even identify the specific loyalty program based on the loyalty program logo (if this is part of the request), for example by searching a database of loyalty program logos using the logo from the captured image.

Figure 4:
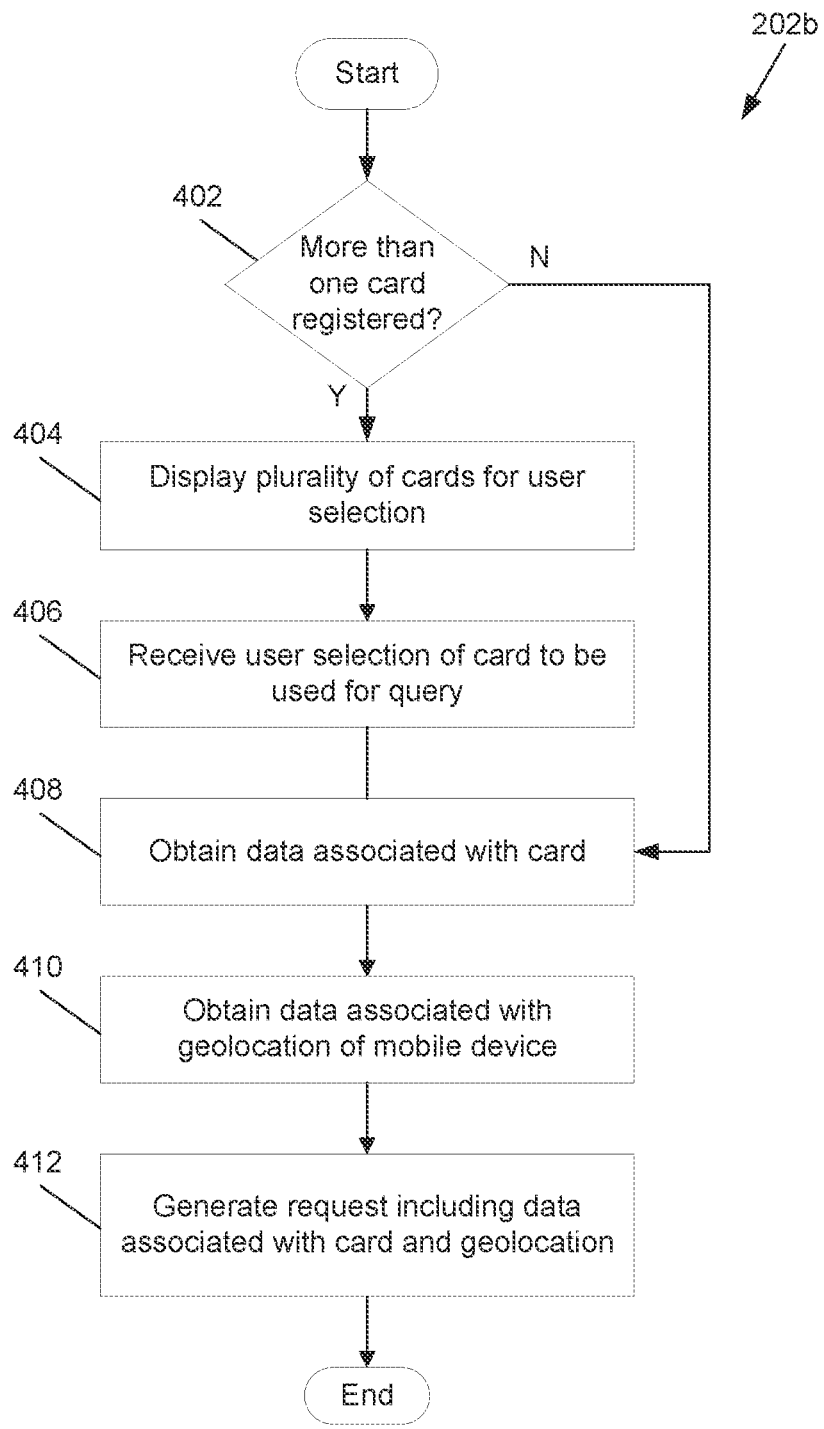
FIG. 4 is a flow diagram of a second example of a card information retrieval process of the method of FIG. 2.

Another example of a process 202b for initiating retrieval of information associated with a payment card is shown in FIG. 4. Process 202b may be performed by digital wallet application 626 executing on mobile device 14, for example.

At step 402, digital wallet application 626 checks whether more than one payment card is registered in the user's digital wallet. If so, at step 404, a plurality of cards of the user's digital wallet is displayed by mobile device 14, and at step 406, the digital wallet application 626 receives a user selection of a card to be used to generate a query to open API service 16.

Once a card is selected, or if only one card is registered in the digital wallet, data associated with the card is obtained, at step 408. For example, the card PAN, or more typically a token associated with the payment card, may be retrieved from the wallet profile of the user.

At step 410, geolocation data of the mobile device 14 may be obtained, for example in the same fashion as described above in relation to step 310 of FIG. 3.

At step 412, the digital wallet application 626 generates a request that includes the data associated with the payment card, and the geolocation data.

In either case, as mentioned above, following execution of the sub-process 202a or the sub-process 202b, the request thereby generated is transmitted to open API service 16, and open API service 16 may then identify (at step 204 of FIG. 2) the available services based on the payment card data and, if present, the geolocation data.

In one specific use case of the method of FIGS. 2 to 4, a user 12 may wish to obtain, in his or her home currency, the actual cost of a credit card purchase in a foreign currency. To this end, user 12 may open camera application 622, and capture an image of the payment card 500 that he or she intends to use in the transaction. Camera application 622 may cooperate with card capture service 616 to capture the image of the payment card 500, and extract the PAN 508 of the payment card, and optionally also the name 504 and/or logo 505 of the issuing bank. Next, camera application 622 may automatically open services application 624, and pass the extracted payment card data to services application 624 to cause the services application 624 to send a request to open API service 16. Services application 624 may also obtain geolocation data of the mobile device 14, using location service 612, and include it in the request prior to sending the request to open API service 16. Open API service 16 may return a list of available services, including, among other things, a currency conversion service. On selection of the currency conversion service by user 12, services application 624 may prompt the user 12 for an amount in the currency of the locale where he or she is presently located. Services application 624 may form a second request that includes the amount, the geolocation of the mobile device 14, and the PAN 508 of the payment card 500. Open API service 16 may receive the second request, and determine an appropriate communication channel for the request, such as a non-secure connection to a currency conversion service or to the issuer 20B (e.g., determined from the PAN 508) of the payment card 500, and then send a further request over the communication channel for a converted amount that reflects the actual amount that will be charged to the user 12's payment card 500 in the home currency, taking into account the conversion rate applied by issuer 20B and any fees that issuer 20B may apply.

In another specific use case of the method of FIGS. 2 to 4, a user 12 may wish to make a call to a local support number for his or her payment card 500. To this end, user 12 may open camera application 622, and capture an image of the payment card 500 that he or she intends to use in the transaction. Camera application 622 may cooperate with card capture service 616 to capture the image of the payment card 500, and extract the PAN 508 of the payment card, and optionally also the name 504 and/or logo 505 of the issuing bank. Next, camera application 622 may automatically open services application 624, and pass the extracted payment card data to services application 624 to cause the services application 624 to send a request to open API service 16. Services application 624 may also obtain geolocation data of the mobile device 14, using location service 612, and include it in the request prior to sending the request to open API service 16. Open API service 16 may return a list of available services, including a call centre service. On selection of the call centre service by user 12, services application 624 may form a second request that includes the geolocation of the mobile device 14, and the PAN 508 of the payment card 500. Open API service 16 may receive the second request, and determine an appropriate communication channel for the request, such as a non-secure connection to the issuer 20B (e.g., determined from the PAN 508) of the payment card 500, and then send a further request over the communication channel for the local call centre number (in the determined geolocation) for issuer 20B. The local call centre number is transmitted to services application 624, which may prompt the user to, or may automatically, call the number to connect the user 12 to the call centre.

In a further specific use case, a user 12 may wish to obtain a balance of a loyalty and rewards program associated with card 500. To this end, user 12 may open camera application 622, and capture an image of the payment card 500 that he or she intends to use in the transaction. Camera application 622 may cooperate with card capture service 616 to capture the image of the payment card 500, and extract the PAN 508 of the payment card, and the name 512 and/or logo 513 of the loyalty program (as described above in relation to FIG. 3). Next, camera application 622 may automatically open services application 624, and pass the extracted payment card data to services application 624 to cause the services application 624 to send a request to open API service 16.

Open API service 16 may return a list of available services, including an account query service. On selection of the account query service by user 12, services application 624 may prompt the user 12 to enter a passcode, associated with payment card 500, to securely access the user 12's account. Open API service 16 may communicate with issuer 20B, by sending an encrypted request including the PAN and the entered passcode to issuer 20B, to validate the user's passcode. Once the passcode is validated, services application 624 may form a second request that includes the loyalty program details and the PAN 508 of the payment card 500. Open API service 16 may receive the second request, and determine an appropriate communication channel for the request, such as a secure connection to a loyalty program server 30 or to the issuer 20B (e.g., determined from the PAN 508) of the payment card 500, and then send a further request over the communication channel, together with an access token that indicates that the user 12's passcode has been validated, for a balance of the user 12's loyalty program points.

Turning now to FIGS. 6 and 7, an example of a mobile device 14 of certain embodiments is shown.

The architecture of mobile device 14 includes a hardware layer 602, an operating system kernel 604, an O/S services layer 610 that sits above the O/S kernel 604, and an application layer 620 that sits above the O/S services layer 610. The mobile device 14 architecture typically also includes a hardware abstraction layer (not shown) that enables O/S kernel 604 and O/S services layer 610 to interact with the various hardware components of the mobile device 14 at a high level.

Advantageously, many of the steps performed as part of method 200 may be executed by components of O/S services layer 610, rather than components of application layer 620. Typically, image capture and processing steps and user validation steps as described above may be shifted to the services layer 610.

By moving at least part of the functionality to services layer 610, it is possible to more easily provide new services in future, with greater efficiency and flexibility in integrating different applications. For example, operations performed by the mobile device 14 in process 200 may be implemented via a banking API, enabling various services (loyalty, currency conversion and call center details etc.), such that applications other than services app 624 or digital wallet 626 can access those services via API calls. Any banking application or any other applications built for travel agents or hotels (for example) can make use of such an API.

O/S services 610 may provide core O/S functions in a protected environment. For example, services in the O/S services layer may pass information on directly to hardware or hardware drivers (which is software typically tightly coupled to the hardware, typically sitting the hardware abstraction layer mentioned above). For example, location service 612 may communicate directly with transceiver(s) 812 of mobile device 14 (FIG. 7), query service 614 may communicate directly with secure element 816 or a trusted execution environment of processor 810, and card capture service 616 may communicate directly with camera 818.

Above the O/S services layer 610, there is the application layer 610, which may comprise any type of application program. By way of example, FIG. 6 shows four specific applications: a camera application 622 for capturing images or video, a services application 624 for obtaining availability of, and accessing, services in relation to payment cards, a digital wallet application 626 for conducting electronic transactions such as payments, and optionally also performing certain steps of the method 200 described above, and a browser application 628.

Importantly, FIG. 6 is not intended to limit the types of frameworks or libraries that may be used in any particular way or in any particular embodiment. Generally, many embodiments of this disclosure propose software activity and architecture in the layers between the hardware 602 and application 620 layers.

FIG. 7 is a block diagram showing exemplary components of the hardware layer 602 of mobile device 14. The mobile device 14 may be a mobile computer device such as a smart phone, a tablet, a personal data assistant (PDA), a palm-top computer, and multimedia Internet enabled cellular telephones.

As shown, hardware 602 includes the following components in electronic communication via a bus 806:

(a) a display 802;
(b) non-volatile (non-transitory) memory 804;
(c) random access memory ("RAM") 808;
(d) N processing components 810;
(e) a transceiver component 812 that includes N transceivers;
(f) user controls 814;
(g) a secure element 816;
(h) a camera 818; and
(i) a NFC controller 820.

Although the components depicted in FIG. 7 represent physical components, many of the components depicted in FIG. 7 may be realised by common constructs or distributed among additional physical components. Moreover, it is certainly contemplated that other existing and yet-to-be developed physical components and architectures may be utilised to implement the functional components described with reference to FIG. 7.

The display 802 generally operates to provide a presentation of content to a user, and may be realised by any of a variety of displays (e.g., CRT, LCD, HDMI, micro-projector and OLED displays).

In general, the non-volatile data storage 804 (also referred to as non-volatile memory) functions to store (e.g., persistently store) data and executable code, including the components of O/S kernel 604, O/S services layer 610, and application layer 620.

In some embodiments for example, the non-volatile memory 804 includes bootloader code, modem software, operating system code, file system code, and code to facilitate the implementation components, known to those of ordinary skill in the art, which are not depicted nor described for simplicity.

In many implementations, the non-volatile memory 804 is realised by flash memory (e.g., NAND or ONENAND memory), but it is certainly contemplated that other memory types may be utilised as well. Although it may be possible to execute the code from the non-volatile memory 804, the executable code in the non-volatile memory 804 is typically loaded into RAM 808 and executed by one or more of the N processing components 810.

The N processing components 810 in connection with RAM 808 generally operate to execute the instructions stored in non-volatile memory 804. As one of ordinarily skill in the art will appreciate, the N processing components 810 may include a video processor, modem processor, DSP, graphics processing unit (GPU), and other processing components.

The transceiver component 812 includes N transceiver chains, which may be used for communicating with external devices via wireless networks. Each of the N transceiver chains may represent a transceiver associated with a particular communication scheme. For example, each transceiver may correspond to protocols that are specific to local area networks, cellular networks (e.g., a CDMA network, a GPRS network, a UMTS network), and other types of communication networks.

Figure 8:
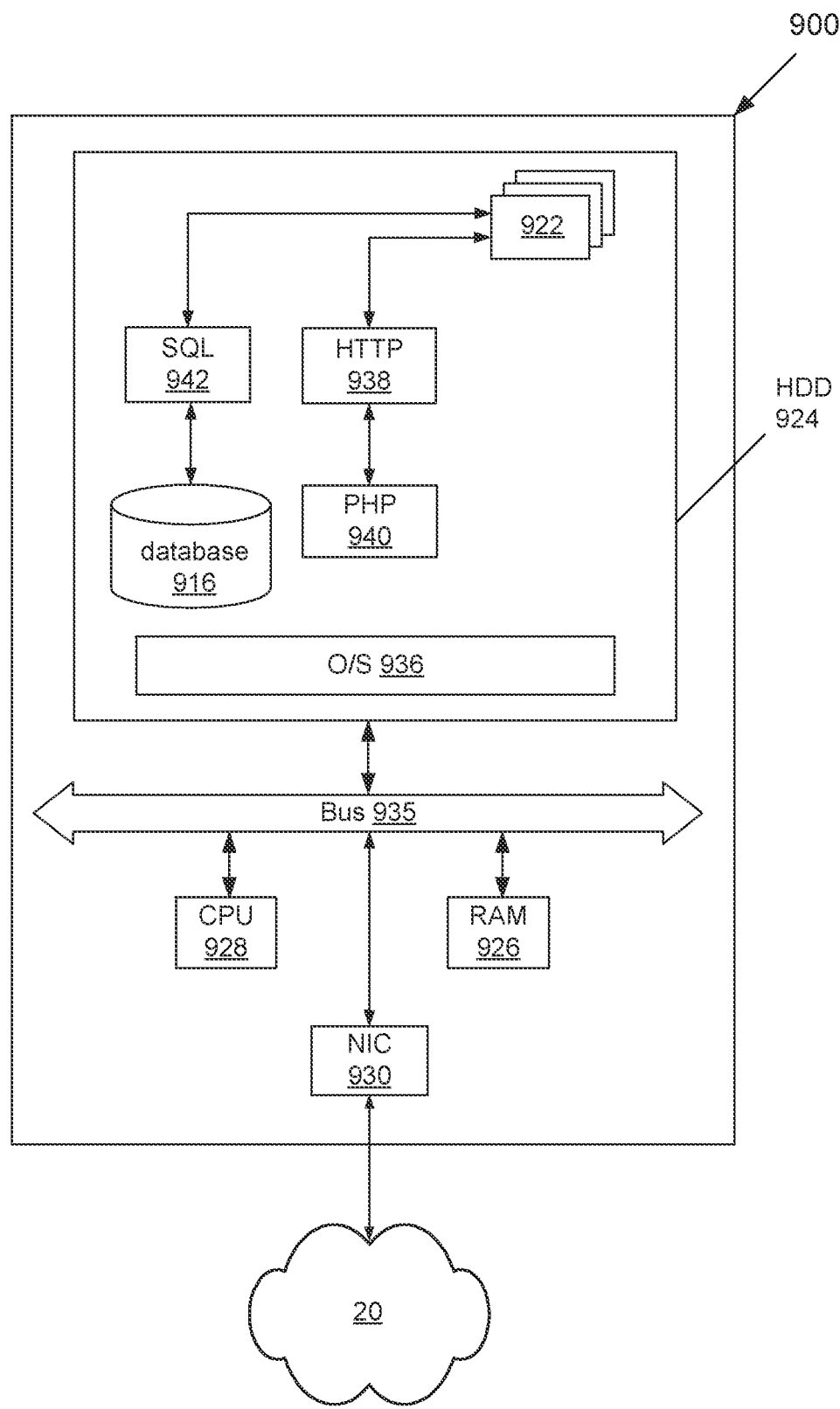
FIG. 8 is a block diagram of the architecture of a computing device for implementing an open API service.

FIG. 8 shows an example computing device 900 that is capable of implementing an open API service 16 of the system 10. In some embodiments, multiple computing devices 900 may be considered to be a single open API service.

The components of the computing device 900 can be configured in a variety of ways. The components can be implemented entirely by software to be executed on standard computer server hardware, which may comprise one hardware unit or different computer hardware units distributed over various locations, which may communicate over a network. Some of the components or parts thereof may also be implemented by application specific integrated circuits (ASICs) or field programmable gate arrays.

In the example shown in FIG. 8, the computing device 900 is a commercially available server computer system based on a 32 bit or a 64 bit Intel architecture, and the processes and/or methods executed or performed by the computing device 900 are implemented in the form of programming instructions of one or more software components or modules 922 stored on non-volatile (e.g., hard disk) computer-readable storage 924 associated with the computing device 900. At least parts of the software modules 922 could alternatively be implemented as one or more dedicated hardware components, such as application-specific integrated circuits (ASICs) and/or field programmable gate arrays (FPGAs).

The computing device 900 includes at least one or more of the following standard, commercially available, computer components, all interconnected by a bus 935:
(a) random access memory (RAM) 926;
(b) at least one computer processor 928, and
(c) a network interface connector (NIC) 930 which connects the computer device 900 to a data communications network (such as network 20) and/or to external devices.

The computing device 900 includes a plurality of standard software modules, including:
(a) an operating system (OS) 936 (e.g., Linux or Microsoft Windows);
(b) web server software 938 such as Apache, available at http://www.apache.org;
(c) scripting language support 940 such as PHP, available at http://www.php.net, or Microsoft ASP; and
(d) structured query language (SQL) modules 942 (e.g., MySQL, available from http://www.mysql.com), which allow data to be stored in and retrieved/accessed from an SQL database 916.

Together, the web server 938, scripting language module 940, and SQL module 942 provide the open API service 16 with the general ability to allow users of the Internet with standard computing devices equipped with standard web browser software to access the open API service 16 and in particular to provide data to and receive data from the database 916.

However, it will be understood by those skilled in the art that the specific functionality provided by the open API service 16 to such users may be provided by scripts accessible by the web server 938, including the one or more software modules 922 implementing the processes, and also any other supporting scripts and data (not shown), including markup language (e.g., HTML, XML) scripts, PHP (or ASP), and/or CGI scripts, image files, style sheets, and the like.

Advantageously, the database 916 forms part of the computer readable data storage 924. Alternatively, the database 916 is located remote from the computing device 900 shown in FIG. 8.

The boundaries between the modules and components in the software modules 922 are exemplary, and alternative embodiments may merge modules or impose an alternative decomposition of functionality of modules. For example, the modules discussed herein may be decomposed into submodules to be executed as multiple computer processes, and, optionally, on multiple computers. Moreover, alternative embodiments may combine multiple instances of a particular module or submodule. Furthermore, the operations may be combined or the functionality of the operations may be distributed in additional operations in accordance with the invention. Alternatively, such actions may be embodied in the structure of circuitry that implements such functionality, such as the micro-code of a complex instruction set computer (CISC), firmware programmed into programmable or erasable/programmable devices, the configuration of a field-programmable gate array (FPGA), the design of a gate array or full-custom application-specific integrated circuit (ASIC), or the like.

Each of the blocks of the flow diagrams of those parts of the process 200 performed by the open API service 16 may be executed by a module (of software modules 922) or a portion of a module. The processes may be embodied in a non-transient machine-readable and/or computer-readable medium for configuring a computer system to execute the method. The software modules may be stored within and/or transmitted to a computer system memory to configure the computer system to perform the functions of the module.

The computing device 900 normally processes information according to a program (a list of internally stored instructions such as a particular application program and/or an operating system) and produces resultant output information via input/output (I/O) devices 930. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

It will be appreciated that many further modifications and permutations of various aspects of the described embodiments are possible. Accordingly, the described aspects are intended to embrace all such alterations, modifications, and variations that fall within the spirit and scope of the appended claims.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

The invention claimed is:

1. A method comprising:
    executing a card capture service on a mobile device, the mobile device including a hardware layer, an operating system kernel, and an operating system services layer that sits above the operating system kernel, wherein the hardware layer includes a camera, and wherein the operating system service layer includes the card capture service and a location service;
    capturing, by the card capture service, an image of a payment card using the camera of the mobile device;
    extracting, by the card capture service, payment card information from the image;
    obtaining, by the location service, a geolocation of the mobile device;
    receiving, by an open application programming interface (API) service, a request from the mobile device, the request including contextual information and the payment card information stored on or obtained at the mobile device, the contextual information including the geolocation of the mobile device;
    in response to the request, determining, by the open API service from the payment card information and the geolocation, a list of services that are available in relation to the payment card information;
    transmitting, by the open API service, the list of services to the mobile device;
    receiving, by the open API service from the mobile device, a selection of one of the services from the list of services;
    determining, by the open API service, a corresponding communication channel by which the selected service is accessible, the corresponding communication channel being directly associated with the selected service, wherein the corresponding communication channel is determined according to both the payment card information and the geolocation; and
    opening, by the open API service, the corresponding communication channel to thereby access the selected service.

2. A method according to claim 1, wherein the request is an open application programming interface (API) call.

3. A method according to claim 1, wherein the payment card information is stored in, or in association with, a digital wallet application on the mobile device.

4. A method according to claim 3, wherein the image is captured by a native camera application of the mobile computing device.

5. A method according to claim 1, wherein the corresponding communication channel is determined by:
    segmenting the image to identify at least one image element that is associated with the selected service; and
    identifying, from the at least one image element, the corresponding communication channel by which said service is accessible.

6. A method according to claim 1, further including validating an authentication credential prior to opening the corresponding communication channel.

7. A system for enabling access to a service by a user of a mobile device, the system comprising:
    a mobile device comprising a hardware layer, an operating system kernel, and an operating system services layer that sits above the operating system kernel,
    the operating system service layer comprising a card capture service and a location service,
    the hardware layer comprising a processor, a memory component, and a camera,
    the memory component including executable code, that when executed by the processor, causes the processor to:
        execute the card capture service;
        capture, by the card capture service, an image of a payment card using the camera;
        extract, by the card capture service, payment card information from the image; and
        obtain, by the location service, a geolocation of the mobile device; and
    a computing device comprising a processor and a non-transitory computer readable storage having stored thereon instructions, that when executed by the processor, cause the processor to perform a service enablement process comprising:
    receiving, from the mobile device by an open application programming interface (API) service, a request, the request including contextual information and the payment card information stored on or obtained at the mobile device, the contextual information including the geolocation of the mobile device;
    in response to the request, determining, by the open API service from the payment card information and the geolocation, a list of services that are available in relation to the payment card information;
    transmitting, by the open API service, the list of services to the mobile device;
    receiving, by the open API service from the mobile device, a selection of one of the services from the list of services;
    determining, by the open API service, a corresponding communication channel by which the selected service is accessible, the corresponding communication channel being directly associated with the selected service, wherein the corresponding communication channel is determined according to both the payment card information and the geolocation; and
    opening, by the open API service, the corresponding communication channel to thereby enable access to the selected service.

8. A system according to claim 7, wherein the request is an open application programming interface (API) call.

9. A system according to claim 7, wherein the payment card information is stored in, or in association with, a digital wallet application of the mobile device.

10. A system according to claim 7, wherein the corresponding communication channel is determined by:
    segmenting the image to identify at least one image element that is associated with the selected service; and
    identifying, from the at least one image element, the corresponding communication channel by which said service is accessible.

11. A system according to claim 7, wherein the service enablement process further includes validating an authentication credential prior to opening the corresponding communication channel.

* * * * *